Figure 1:
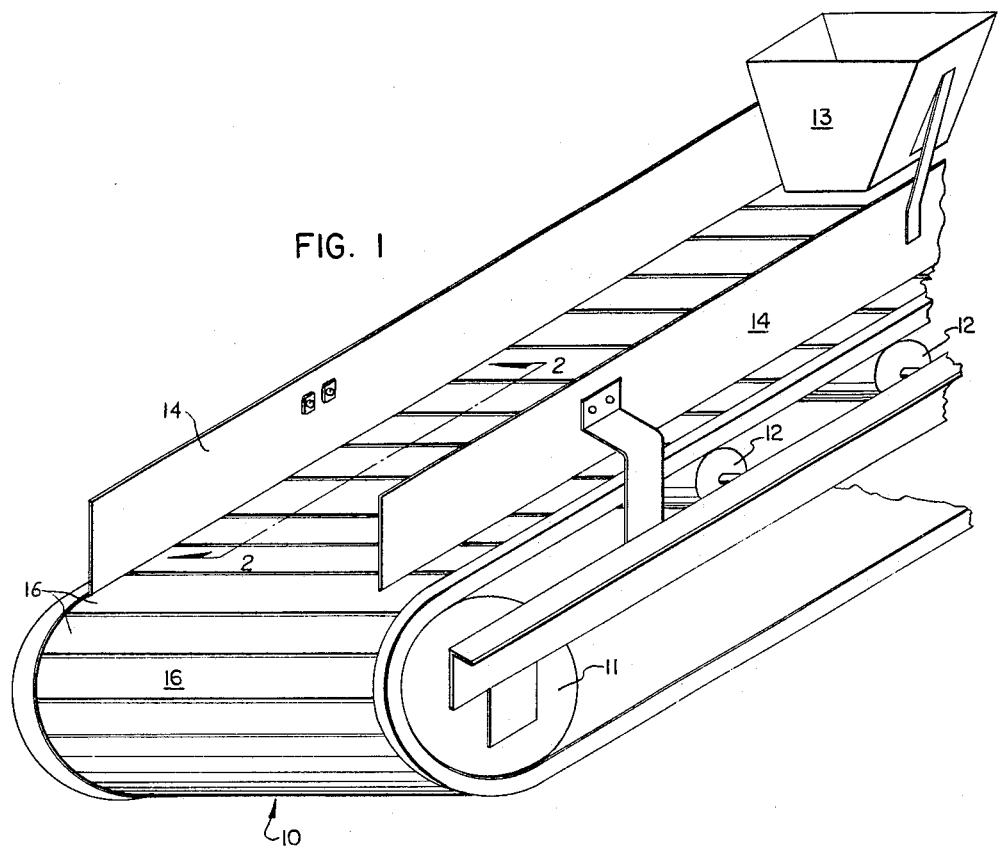

Nov. 29, 1966    S. D. MICHAELSON ETAL    3,288,273
SELF-CLEANING CONVEYOR BELT HAVING REPLACEABLE WEAR SURFACES
Filed Dec. 21, 1964

INVENTOR.
STANLEY D. MICHAELSON
KARL F. EILERS
BY
ATTORNEYS 3,288,273
SELF-CLEANING CONVEYOR BELT HAVING
REPLACEABLE WEAR SURFACES
Stanley D. Michaelson, Salt Lake City, Utah, and Karl F. Eilers, Hayden Lake, Idaho, assignors to Kennecott Copper Corporation, New York, N.Y., a corporation of New York
Filed Dec. 21, 1964, Ser. No. 419,768
13 Claims. (Cl. 198—195)

This invention relates to conveyor belts for endless belt conveyors, and especially those used to transport ores and other metallurgical materials.

Conveyor belts of this type are subjected to exceptionally hard usage. They are frequently damaged by impact of heavy and sharp rocks and pieces of ore dropped thereon and by abrasive action of such material during transport. Moreover, some materials are corrosive in character and/or are transported while hot. Both conditions tend to damage the belt, especially where cuts permit access to the belt carcass, which is often of fabric subject to rapid deterioration when exposed.

It is a principal object of the present invention to provide a conveyor belt that includes a superficial wear surface capable of resisting impact and abrasion and of protecting the belt proper from heat and chemical action, without interfering with conventional supporting and operating mechanisms, such as idlers and head and tail pulleys.

It is a further object to provide such a wear surface that will be self-cleaning and self-aligning during conveyor operation.

Principal features of the invention in the attainment of these objects are the making of the belt proper in the form of a flexible, endless or spliced backing member, adapted to be received by and operate on conventional supporting and driving structure, but provided with longitudinally extending, resilient marginal pockets, which open toward the center of the belt on the working surface thereof and serve to receive opposite ends of either overlapping or edge-to-edge abutting wear strips or plates that extend across the intermediate surface of the belt to form a superficial wear surface.

There is shown in the accompanying drawing specific embodiments of the invention representing what are presently regarded as the best modes of carrying out the generic concepts in actual industrial practice. From the detailed description of these presently preferred forms, other more specific objects and features will become apparent.

Figure 2:
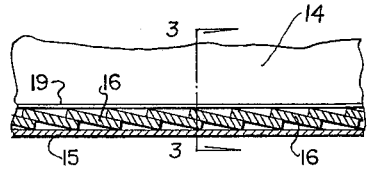
Figure 3:
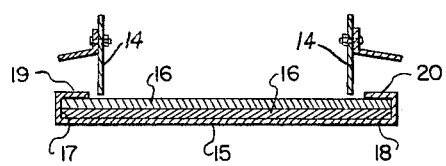

In the drawing:

FIG. 1 is a fragmentary perspective view of an endless belt conveyor embodying a conveyor belt conforming to the invention;

FIG. 2, a vertical section taken on line 2—2 of FIG. 1;

FIG. 3, a fragmentary vertical section taken on line 3—3 of FIG. 2, and

Figure 4:
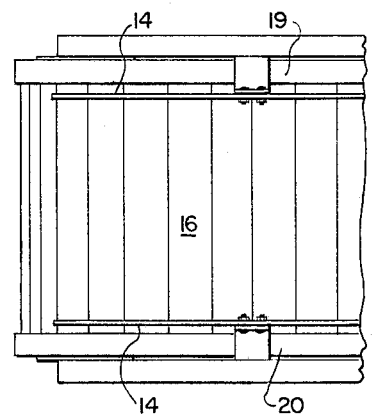

FIG. 4, a fragmentary top plan view of another form of conveyor belt conforming to the invention.

Referring now to the drawings:

Illustrated in FIG. 1 is an endless conveyor belt 10, operatively mounted on conventional mechanism, including a tail pulley 11 and idlers 12 for the upper, working run of the belt.

A usual power-driven head pulley (not shown) is provided at the other end of the belt, or at some intermediate point, and material is fed onto the belt through a customary chute 13. Skirt members 14 are preferably positioned at each side of the belt and extend down from the end of the chute to a position just above the load-carrying surface. The skirt members desirably extend from the chute 13 along the length of the conveyor toward the discharge end thereof, to prevent material spilling off the sides of the conveyor belt.

The belt 10 comprises an endless flexible backing member 15, which may be constructed of any usual conveyor belting material, and elongate wear strips 16 that form a superficial cover for the backing member.

In the construction illustrated in FIGS. 1–3 each wear strip 16 partially overlaps the one ahead of it in the direction of travel of the belt, and the strips are held in place by longitudinal pockets 17 and 18 running the length of the backing member at opposite sides thereof. The pockets are formed by mutually opposite inturned edges 19 and 20 of the backing member 15. These edges are preferably constructed integral with the support belt, as shown and are somewhat resilient, but can be separately formed and affixed thereto by bonding, riveting, bolting, etc. The distance between the backing member and each inturned edge is small, so that the wear strips placed therein are tightly gripped.

In operation, the overlapping relationship of the wear strips provides a washboard type surface that readily engages and transports material dumped thereon and normally prevents material being forced between the strips. As the belt passes around the guide pulleys at the discharge end of the conveyor the material carried on and ahead of the raised portion of each strip is dumped. As the belt starts its return run, the strips separate slightly to allow any material that may have become wedged between them to be discharged. Thus, the belt is self-cleaning as it passes around the discharge end.

At the same time, the engagement of the belt with the end pulley causes wear strips 16 to align themselves normal to the longitudinal axis of the belt.

If a smooth load-carrying surface is desired it is a simple matter to position wear strips 16 such that they are in abutting relationship, as shown for example in FIG. 4.

Strips 16 can be made of any desirable material, such as rubber, metal, ceramics, glass, etc. that will withstand the effects of the material carried, but they must be sufficiently laterally rigid that they will not bow and fall out of pockets 17 and 18 during the return run of the belt. Since they are simply inserted in the pockets, they are easily removed and replaced.

Whereas there is here illustrated and specifically described a certain preferred construction of apparatus which is presently regarded as the best mode of carrying out the invention, it should be understood that various changes may be made and other construction adopted without departing from the inventive subject matter particularly pointed out and claimed herebelow.

We claim:

1. A conveyor belt, comprising a flexible endless backing member; means providing inturned marginal edges extending the length of the flexible backing member and defining, with the backing member, pockets at opposite sides of the belt; and elongate wear strips extending from within each pocket and across the backing member, whereby said wear strips are tightly held in position by said backing member and said inturned marginal edges to form a superficial wear surface for the belt.

2. A conveyor belt according to claim 1 wherein the means providing inturned marginal edges are resilient.

3. A conveyor belt according to claim 2 wherein the means providing inturned marginal edges are formed integral with the backing member.

4. A conveyor belt according to claim 1 wherein each wear strip partially overlaps the one ahead of it.

5. A conveyor belt according to claim 1 wherein the wear strips are made of metal.

6. A conveyor belt according to claim 1 wherein each wear strip abuts the wear strips adjacent thereto.

7. A conveyor belt according to claim 3 wherein each wear strip partially overlaps the one ahead of it.

8. A conveyor belt according to claim 3 wherein the wear strips are made of metal.

9. A conveyor comprising: a flexible, endless backing belt; a plurality of separate wear strips disposed on the outer surface of the belt to extend transversely thereof, and effectively covering said belt surface; and means secured to the backing belt and flexible therewith, and disposed continuously along the opposite lengthwise edges of the belt, for frictionally securing each of said strips thereon.

10. A conveyor in accordance with claim 8 wherein said wear strips are relatively short in the lengthwise direction of the belt.

11. A conveyor in accordance with claim 9 wherein the wear strips are serially overlapped.

12. In combination, a conveyor comprising a flexible, endless backing belt, a plurality of separate wear strips that are disposed on the outer surface of the belt to extend transversely thereof, and that effectively cover said belt surface, said wear strips being relatively short in the lengthwise direction of the belt and being serially overlapped thereon in the direction of travel, means secured to the backing belt and flexible therewith, and disposed along the opposite lengthwise edges of the belt, for detachably securing each of said strips thereon, and at least one generally cylindrical pulley around which the conveyor is trained, and wherein the diameter of said pulley is so proportioned relative to the size of the wear strips that adjacent wear strips diverge from each other upon movement of the belt around the pulley.

13. A conveyor comprising a flexible, endless backing belt; a plurality of separate wear strips disposed on the outer surface of the belt to extend transversely thereof, and effectively covering said belt surface, said wear strips being relatively short in the lengthwise direction of the belt and being characterized by substantial rigidity in the same direction, relative to the backing belt; and means detachably securing only the ends of said strips to said backing belt and permitting limited angular movement of each of said strips relative to the backing belt, and relative to adjacent strips, upon curvilinear movement of the backing belt, said means being secured to the backing belt and flexible therewith.

References Cited by the Examiner
UNITED STATES PATENTS

| | | | |
|---|---|---|---|
| 517,865 | 4/1894 | Keeling | 198—195 X |
| 1,438,566 | 12/1922 | Wiggins | 198—193 |
| 2,946,428 | 7/1960 | Baker | 198—193 |

EVON C. BLUNK, *Primary Examiner.*

R. E. KRISHER, A. C. HODGSON, *Assistant Examiners.*